(12) United States Patent
Briehl et al.

(10) Patent No.: US 6,170,736 B1
(45) Date of Patent: Jan. 9, 2001

(54) SEMICONDUCTOR DIE ATTACH METHOD AND APPARATUS THEREFOR

(75) Inventors: Martin J. Briehl, Scottsdale; Russell J. Elias, Tempe; Douglas L. Glover, Phoenix; Marjorie S. Errickson, Tempe, all of AZ (US)

(73) Assignee: Motorola, Inc., Schaumburg, IL (US)

( * ) Notice: Under 35 U.S.C. 154(b), the term of this patent shall be extended for 0 days.

(21) Appl. No.: 09/072,058

(22) Filed: May 4, 1998

(51) Int. Cl.[7] ................................................. B23K 31/02
(52) U.S. Cl. ............................ 228/212; 228/9; 228/49.1
(58) Field of Search ................................ 228/212, 179.1, 228/9, 49.1, 5.1

(56) References Cited

U.S. PATENT DOCUMENTS

| 3,738,560 | * | 6/1973 | Kulicke, Jr. et al. | 228/10 |
| 5,173,338 | * | 12/1992 | Sharp et al. | 427/287 |
| 5,810,926 | * | 9/1998 | Evers | 118/309 |

* cited by examiner

Primary Examiner—Patrick Ryan
Assistant Examiner—M. Alexandra Elve
(74) Attorney, Agent, or Firm—Robert F. Hightower

(57) ABSTRACT

A semiconductor die bonder (10) has a height adjuster (13) that is positioned next to the die bonding head (11). The height adjuster (13) assist in ensuring that die bonding head (11) positions a semiconductor die (36) at the desired bond line thickness.

8 Claims, 1 Drawing Sheet

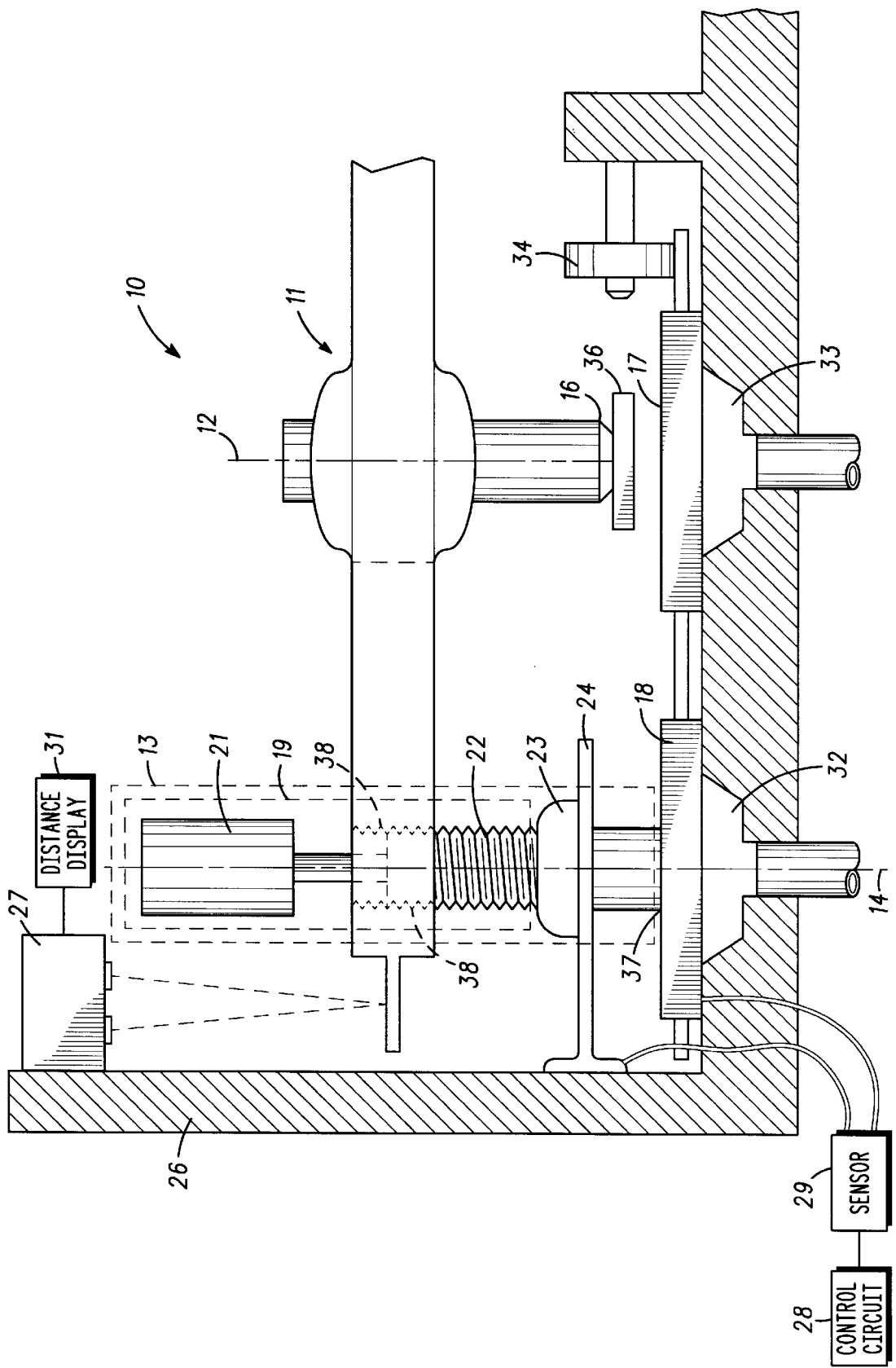

SEMICONDUCTOR DIE ATTACH METHOD AND APPARATUS THEREFOR

BACKGROUND OF THE INVENTION

The present invention relates, in general, to semiconductor packaging, and more particularly, to semiconductor die attachment.

In the past, the semiconductor industry utilized a variety of techniques to attach semiconductor die to semiconductor package leadframes. Typically, equipment commonly referred to as a die bonder is utilized to pick up semiconductor die and attach them to a leadframe using adhesives such as solder or conductive epoxies. Such die bonding equipment is well known in the art and is available from a variety of equipment vendors. One problem with prior die bonding equipment and methods is the inability to accurately control the thickness of the adhesive between a semiconductor die and a semiconductor package leadframe.

Typically, the die bonding equipment has a die bonding head that picks up a semiconductor die, positions it over a semiconductor leadframe, and lowers the semiconductor die down onto the leadframe for attachment. The die attach head typically is attached to the frame by a long arm. The downward movement of the die bonding arm to lower the head is controlled by an adjusting cam or mechanical stop located remotely from the head at the end of the arm and attached to a frame or support of the die attach equipment. Consequently, the control capability of the adjusting cam varies because of the long distance between the adjusting cam and the die bonding head. Consequently, the thickness of the die attach adhesive, commonly referred to as the bond line thickness (BLT), typically has an accuracy of approximately plus or minus fifty microns. This variation in bond line thickness results in variations in the parameters of the semiconductor die attached to the leadframe often causing these parameters to not match the specifications for the semiconductor device. This nonconformity to the specifications results in lower yields and increased manufacturing costs.

Accordingly, it is desirable to have a die attach method that accurately controls the bond line thickness to an accuracy less than fifty microns.

BRIEF DESCRIPTION OF THE DRAWING

The sole FIGURE schematically illustrates a portion of a die bonder according to the present invention.

DETAILED DESCRIPTION OF THE DRAWING

The sole FIGURE schematically illustrates a die bonder 10 that accurately controls the bond line thickness between a semiconductor die 36 and a die attach area 17. Typically, die attach area 17 is part of a semiconductor leadframe that will subsequently be formed into a semiconductor package. Die bonder 10 includes a die bonding head 11 in addition to other elements that are not shown in the sole FIGURE such as a frame and elements necessary to cause the movement of head 11. These items are omitted for the sake of clarity in the drawing and explanation, however, such items are well known to those skilled in the art. Die bonding head 11 has a pick-up tip 16 that is used to pick-up die 36 and hold die 36 while moving it from the pick-up area (not shown) to die attach area 17. Die bonding head 11 has a major axis 12 through head 11 and pick-up tip 16.

Head 11 also has a height adjuster 13, illustrated by a dashed box, that is used to control the bond line thickness. Adjuster 13 has a major axis 14 that is substantially coplanar to axis 12. Height adjuster 13 is mounted to or made as a part of head 11 and moves coextensively with tip 16. Height adjuster 13 can be added to or mounted on commercially available die bonders that are well known to those skilled in the art. In the preferred embodiment, height adjuster 3 is mounted to an ESEC die bonder model 2006R which is available from ESEC U.S.A., Inc. of Phoenix, Ariz. Adjuster 13 has a contact end 37 that contacts a reference attach area 18 which is substantially coplanar to or in a parallel plane to the plane of die attach area 17. Typically, areas 17 and 18 are manufactured as two separate attachment areas of a single position on a leadframe in order to attach two different semiconductor die within a single semiconductor package. However, reference area 18 may be a separate reference anywhere on the leadframe or even on frame 26 as long as adjuster 13 is sufficiently close to tip 16 to provide accurate control of the bond line thickness. Typically, adjuster 13 can be less than approximately two to three centimeters from tip 16.

Height adjuster 13 also includes a height adjuster or positioner 19 that is attached to head 11 and extends below and in a direction from head 11 that is the same as the direction tip 16 extends from head 11. In the preferred embodiment, positioner 19 includes a miniature micrometer 22 which is formed as a screw that is mounted through a threaded hole, shown by dashed lines 38, through head 11. In this preferred embodiment, the screw has eighty threads/inch so that one turn equals a movement of micrometer 22 of approximately three hundred eighteen microns. As will be seen hereinafter, movement of micrometer 22 moves head 11. This provides accurate control of the height or the distance that head 11 moves for one turn of micrometer 22. Other values of thread pitch can be used as long as they provide accurate control of the height that head 11 moves for each turn of micrometer 22. Additionally, in this preferred embodiment, micrometer 22 is driven by a motor 21 that has a gear ratio of one thousand twenty four-to-one (1024:1) so that each revolution of motor 21 provides very accurate control of the distance head 11 moves. Other suitable gear ratios include gear ratios ranging from seven hundred sixty to one (760:1) to one thousand three hundred to one (1300:1).

Adjuster 13 also includes a spacer 23 that is positioned between reference attach area 18 and positioner 19. As will be seen hereinafter, spacer 23 is utilized to ensure that positioner 19 does not accidentally hit a semiconductor die as head 11 moves away from die attach area 17 to a remote area, such as a die pick-up area, to pick-up another semiconductor die. A flexible member 24 is utilized to hold and position spacer 23 above reference area 18. As head 11 raises away from die attach area 17, flexible member 24 raises spacer 23 above reference attach area 18 to allow areas 17 and 18 to be moved and a new set of areas 17 and 18 can move underneath head 11.

Head 11 is calibrated to provide the desired bond line thickness by setting the position of height adjuster 13 for a particular die thickness. Thereafter, semiconductor die are sequentially attached to all the die attach areas as long as all die have the same thickness. Calibration is accomplished by placing a die attach area 17 and a reference attach area 18 in the appropriate positions under tip 16 and end 37, respectively. Head 11 moves away from die attach area 17 and picks up semiconductor die 36 and then moves die 36 to a position above die attach area 17. Head 11 is lowered until micrometer 22 contacts spacer 23 and pushes contact end 37 against reference area 18. This stops head 11 at a position before die 36 touches area 17 because no die attach adhesive is applied to area 17.

Thereafter, motor 21 is engaged to lower head 11 until die 36 contacts area 17. Motor 21 remains engaged to move micrometer 22 until end 37 loses contact with area 18. In the preferred embodiment, a sensor 28 sends a small electrical current through member 24 to spacer 23 and through area 18 back to sensor 28. When contact is lost between end 37 and area 18, the current no longer flows and sensor 28 can detect the loss of contact. A control circuit 29 can provide a signal indicating such loss of contact. At this point after the loss of contact, die 36 is in contact with area 17. This is taken as a reference point and sets the bond line thickness to zero. Next, motor 21 is engaged to move in the opposite direction lowering micrometer 22 and extending end 37 until end 37 once again touches area 18. As motor 21 continues to move, head 11 begins to rise due to the pressure exerted by micrometer 22, through spacer 23, on area 18. A distance measuring device 27 monitors the distance that head 11 moves away from the reference point and displays the distance on a distance display 31. Motor 21 continues to move until display 31 shows that head 11 has moved the desired bond line thickness distance away from the reference point. At which time motor 21 stops. At this point, die 36 is positioned the desired bond line thickness distance above area 17. Therefore, die bonder 10 is now calibrated for attaching semiconductor die to the die attach area. Each time head 11 brings a new semiconductor die above a new die attach area, head 11 will lower until micrometer 22 contacts spacer 23 and spacer 23 contacts a new reference area. This prevents head 11 from lowering die 36 any closer than the bond line thickness to the new die attach area 17. Consequently, die attach material placed on die attach area 17 will be displaced to ensure the proper bond line thickness is maintained.

Head 11 then raises, leaving die 36 attached to the die attach material and thereby to area 17. As head 11 raises, flexible member 24 slightly raises spacer 23 above reference area 18 allowing a new reference area 18 and attach area 17 to move into position. Also, head 11 moves remotely to a location where semiconductor die are located, picks up another semiconductor die, and once again moves over to perform the attachment process. Because micrometer 22 has a distance below head 11 that is less than tip 16, micrometer 22 does not touch any semiconductor die during the process as head 11 moves to pick up the new semiconductor die.

Distance measuring device 27 can be any distance measuring equipment that can accurately measure the distance moved by head 11 during the portion of the calibration operation where adjuster 13 moves head 11 and die 36 off of area 17 by the bond line thickness distance. Typically, the bond line thickness is approximately ninety to one hundred fifty microns and distance measuring equipment having an accuracy of two microns over such a range is suitable. In the preferred embodiment, a laser interferometer manufactured by Keyence model LB-12-P with an amplifier model LB-72-P and a sensor controller model RD-50 manufactured by Keyence of Osaka Japan is utilized for adjuster 13.

In order to assist in maintaining areas 17 and 18 substantially coplanar together, vacuum hold downs 32 and 33 are utilized to hold areas 18 and 17, respectively, in position during the die attach and calibration operations. Vacuum hold downs 32 and 33 provide a surface area that is substantially 80% of the surface area of areas 17 and 18 in order to provide such planarity. In addition, rollers 34 outboard of the leadframe containing areas 17 and 18 are mounted to frame 26 of the die bonding station equipment to assist in holding the leadframe in position during the bonding operations. It should be noted that there may be one or more rollers on one or both sides of the leadframe. Other hold-down mechanisms such as a stationary retaining lip can be used instead of rollers 34.

It should be noted that adjuster 13 can have other configurations in addition to a miniature micrometer. For example, adjuster 13 could be a cam operated by gear reduction to provide accurate movement. By placing the cam above the reference attach area and using the calibrating sequence, the cam can provide accurate control of the bond line thickness. Additionally, spacer 23 and flexible member 24 could be removed by altering the height of micrometer 22 while head 11 is moving over to pick up a new semiconductor die and restoring the position of micrometer 22 while head 11 is moving back above the attachment areas. Such altering would typically be under the control of an electronic controller to ensure each setting is accurately restored. Furthermore, it should be noted that the calibration sequence can be conducted manually or a control circuit, not shown, can be utilized to automatically control the calibration operation.

By now it should be apparent that there has been provided a novel die bonder and method of attaching semiconductor die. Utilizing a height adjuster located in a plane parallel to the plane of the die pick-up tip provides accurate control of a die bonding head at the place where bonding occurs thereby accurately controlling the bond line thickness. Utilizing a micrometer to provide small accurate movements of the die bonding head facilitates accurately controlling the bond line thickness. Utilizing a reference attach area prevents interfering with the die bonding head during the die attach operation.

What is claimed is:

1. A method of attaching a semiconductor die comprising:

providing a die bonding head holding a semiconductor die;

lowering the die bonding head until a height adjuster touches a reference attach area;

moving the height adjuster until the semiconductor die at least contacts a die attach area;

setting a bond line thickness distance to zero; and moving the height adjuster until the semiconductor die moves a bond line thickness distance from the die attach area.

2. The method of claim 1 wherein after the step of moving the height adjuster until the semiconductor die moves a bond line thickness further including placing a die attach material onto the die attach area, moving the semiconductor die toward the die attach area until the height adjuster contacts the reference attach area, and moving the die bonding head away from the die attach area leaving the semiconductor die contacting the die attach material.

3. The method of claim 1 wherein lowering the die bonding head until the height adjuster touches the reference attach area includes positioning the reference attach area in a plane substantially parallel to a plane of the die attach area.

4. The method of claim 1 wherein moving the height adjuster until the semiconductor die at least contacts the die attach area includes moving the height adjuster until the height adjuster moves away from the reference attach area.

5. The method of claim 1 wherein moving the height adjuster until the semiconductor die moves the bond line thickness distance includes using a distance measuring device to measure a distance the die bonding head moves away from the die attach area.

6. The method of claim 1 further including holding the die attach area in position with a first vacuum and holding the reference attach area in position with a second vacuum.

7. The method of claim 6 further including using a vacuum area that is at least eighty per cent an area of the die attach area.

8. The method of claim 6 further including holding the die attach area and the reference attach area in place with externally mounted rollers.

* * * * *